United States Patent [19]
Etheridge

[11] Patent Number: 5,150,613
[45] Date of Patent: Sep. 29, 1992

[54] MATERIAL LEVEL SENSING DEVICE

[76] Inventor: Johnny E. Etheridge, 1744 Old Powhatan Estates Dr., Powhatan, Va. 23139

[21] Appl. No.: 683,059

[22] Filed: Apr. 10, 1991

[51] Int. Cl.$^5$ .......................... G01K 23/60; B02C 9/04
[52] U.S. Cl. ........................................ 73/291; 73/308; 340/623; 361/179; 241/33
[58] Field of Search ................. 73/291, 308, 306, 322; 340/623; 361/179

[56] References Cited

U.S. PATENT DOCUMENTS

| | | | |
|---|---|---|---|
| 1,573,310 | 2/1926 | Foulds | 73/291 |
| 3,359,799 | 12/1967 | Lubin | 73/322 |
| 3,412,292 | 11/1968 | Forbes | 361/179 X |
| 4,804,148 | 2/1989 | Etheridge | . |
| 4,909,449 | 3/1990 | Etheridge | . |

Primary Examiner—Daniel M. Yasich
Attorney, Agent, or Firm—Fay, Sharpe, Beall, Fagan, Minnich & McKee

[57] ABSTRACT

A material level sensing device for detecting when the level of unprocessed material has reached a predetermined threshold includes a contact-type probe extending from a housing into a retaining bowl where unprocessed material is collected before processing. Within the housing is disposed a proximity sensor. The housing itself is suspended from an overhanging support. When the material level reaches the predetermined threshold, the material displaces the material level sensor, which displacement is sensed by the proximity sensor. The proximity sensor then sends a signal to an external system indicating that the material has reached the threshold.

11 Claims, 6 Drawing Sheets

MATERIAL LEVEL SENSING DEVICE

BACKGROUND OF THE INVENTION

1. Field of the Invention

The present invention relates generally to the size reduction of materials, and, more particularly, to a system for controlling the material throughput of a size-reduction plant such as a rock crusher used in an aggregate production plant.

2. Description of the Related Art

A typical materials size reduction plant environment such as a rock crushing plant is a hazardous environment in which processing and process control equipment must be able to withstand the shocks and other hazards associated with tumbling rock and aggregate material. Moreover, the processing system must be capable of accommodating changes in operating parameters that become necessary in accordance with changing needs.

For example, during a typical processing run, variations in coarseness, hardness, size and moisture content typically occur. These variations may be due to variations in the large-size material as it enters a crusher bowl, or may be due to factors that develop within the material as it sits in the crusher bowl waiting to be crushed. Such variations can affect the speed at which the equipment crushes the rock, as well as the speed at which the rock itself physically moves through the system.

Previously, the art has attempted to regulate the throughput of material by incorporating contact-type or noncontact-type means for sensing the level of material accumulating within the crusher bowl, the notion being that knowledge of the rising or falling level of material within the crusher bowl can be translated into adjustment of the flow rate of material entering the crusher bowl.

One type of sensor known to the art is disclosed in the applicant's prior U.S. Pat. No. 4,804,148. The crusher control system disclosed in that patent includes a suspended sensor, including a probe assembly that is contacted by material rising within the crusher bowl. When the material reaches a certain level, it contacts the probe, causing the probe to trip a microswitch, which in turn sends a signal to external circuitry for diverting a portion of the incoming material away from the crusher bowl until the level of material within the crusher bowl subsides.

Other attempted solutions include noncontact-type solutions such as the ultrasonic level indicator disclosed in U.S. Pat. No. 4,909,449 to Etheridge. This solution works on certain crushers, but is relatively expensive, and requires specially trained engineers for setup and maintenance. Moreover, the ultrasonic level indicator cannot be employed with certain types of existing crushers, particularly those having distributor plates that move and thus limit the area of detection.

SUMMARY OF THE INVENTION

The present invention resolves the problems existing in the prior art by incorporating a proximity sensor in a contact-type probe, such as that disclosed in the aforementioned U.S. Pat. No. 4,804,148. The present invention is useful, for example, in any cone-type rock crusher, and, by its design, is capable of withstanding the harsh environment of state-of-the-art rock crushers. The inventive probe is further sensitive enough to accurately detect material level without sacrificing reliability.

By way of example, the inventive probe includes a housing and a material level sensing means having a first end disposed within the housing, and a second end disposed without the housing and arranged to be contacted by rising material within a crusher bowl. The housing is suspended by a chain or other hanging means. Located adjacent the first end is a proximity sensor, which has a nominal quiescent point and preferably does not physically contact the first end of the material level sensor, but instead determines whether the first end is within a predefined range from the proximity sensor. When material rising within the crusher bowl contacts the second end and forces the material level sensor to be displaced from an equilibrium position, the first end is likewise displaced, causing the proximity sensor to signal external control/analysis circuitry to adjust the flow of material entering the crusher bowl, thus preventing an overflow condition.

Similarly, when the material level subsides below that at which the material contacts the second end of the material level sensor, the material level sensor returns to its equilibrium position. The proximity sensor thus determines that the first end is again adjacent to the proximity sensor, and signals to the external control/analysis circuitry to increase the flow rate of incoming material to the crusher bowl.

DETAILED DESCRIPTION OF THE PREFERRED EMBODIMENTS

Figure 1:
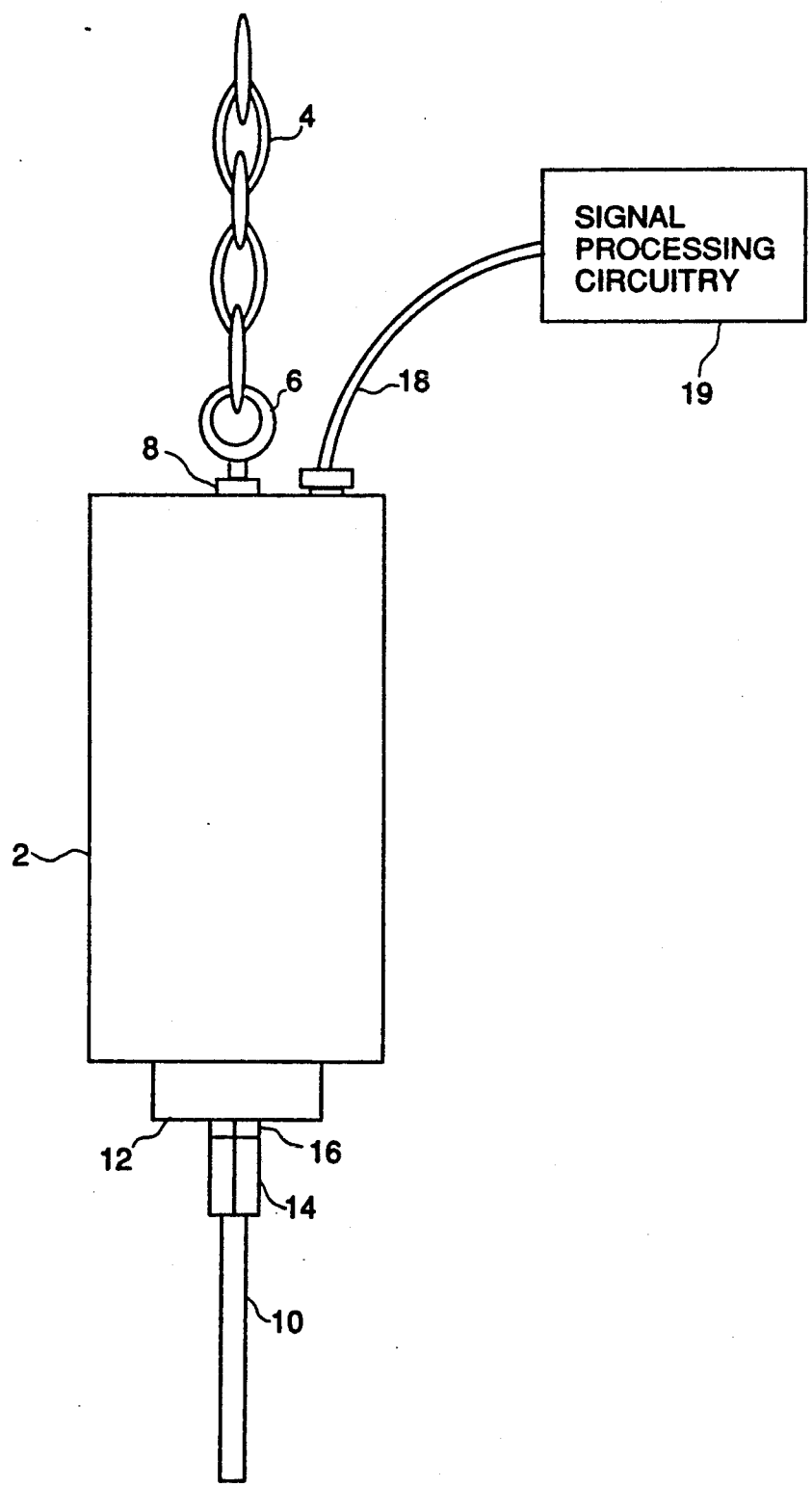
FIG. 1 illustrates the externally visible components of the inventive probe.

FIG. 1 schematically shows the inventive probe. The probe includes a housing 2 supported by a chain 4, which is connected to housing 2 by eye bolt 6 and nut 8. These latter features are merely an illustrative means for suspending the inventive probe.

Figure 5:
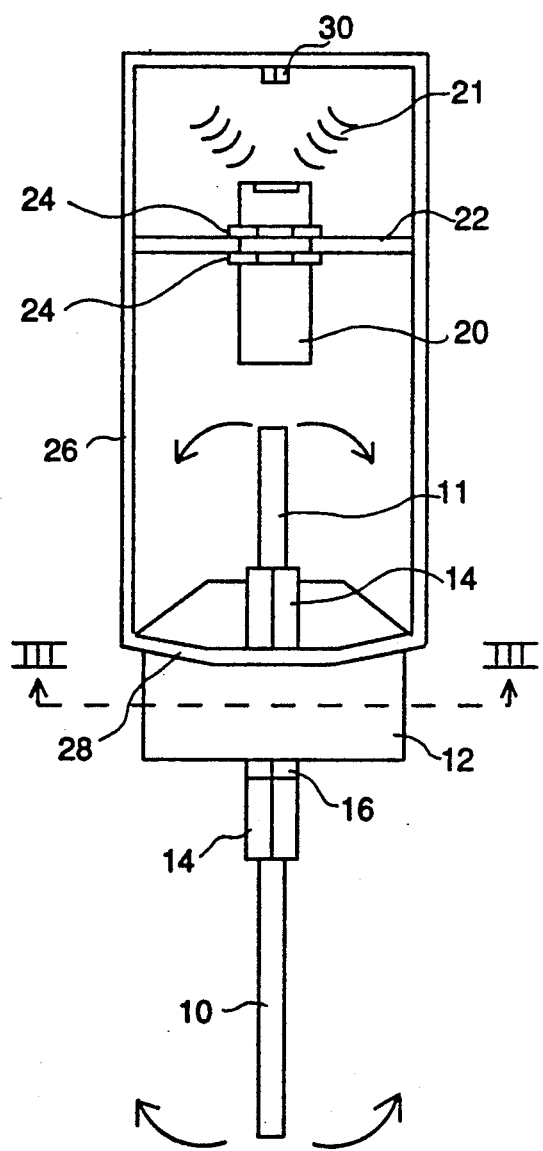
FIG. 5 illustrates an embodiment of the inventive probe as shown in FIG. 2a, but wherein the proximity sensor transmits a signal wave instead of an electrical signal over a wire.

Extending beneath and suspended from the probe is a material level sensing means illustratively shown as a sensor bolt 10, which may be formed from a ⅜ inch hardened steel bar, for example. Sensor bolt 10 further extends upward within housing 2, where it is attached by galvanic coupling 12 and rod coupling 14 via nut 16. Supply cord 18 provides power for a proximity switch, not shown, located inside housing 2. Supply cord 18 also provides the means by which the proximity signal from the internal proximity switch is communicated to external control/analysis circuitry. One of ordinary skill in the art will readily recognize that other means for communicating information between the probe and the control/analysis circuitry, including ultrasonic wave or radio, infrared or other electromagnetic wave transmission, may be employed, such as, schematically shown by tie signal lines 21 above sensor 20 in FIG. 5.

Figure 2A:
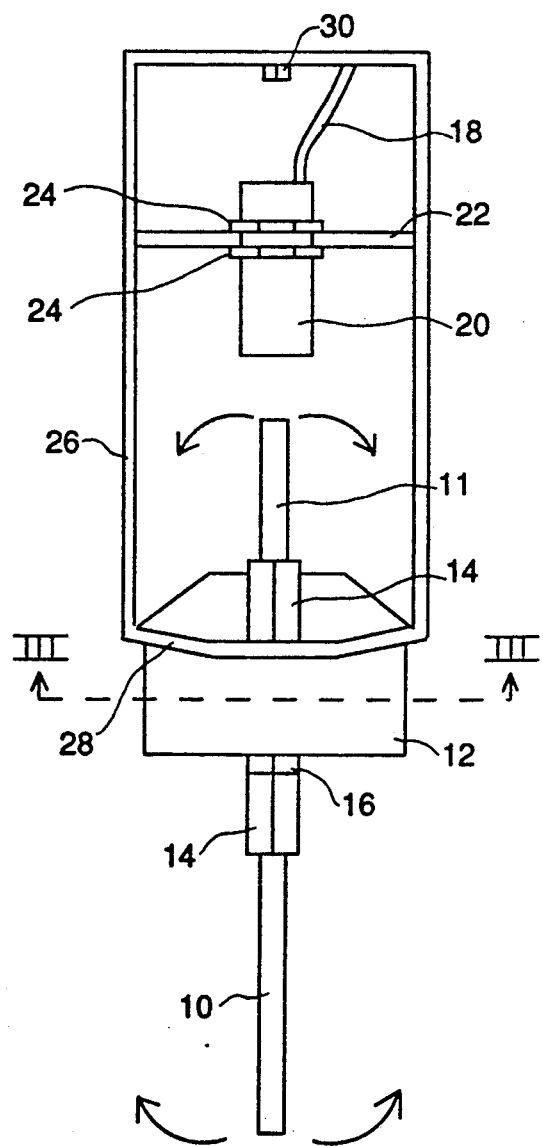
FIGS. 2a and 2b are relative front and side views, respectively, of the invention with the outer housing removed.
Figure 2B:
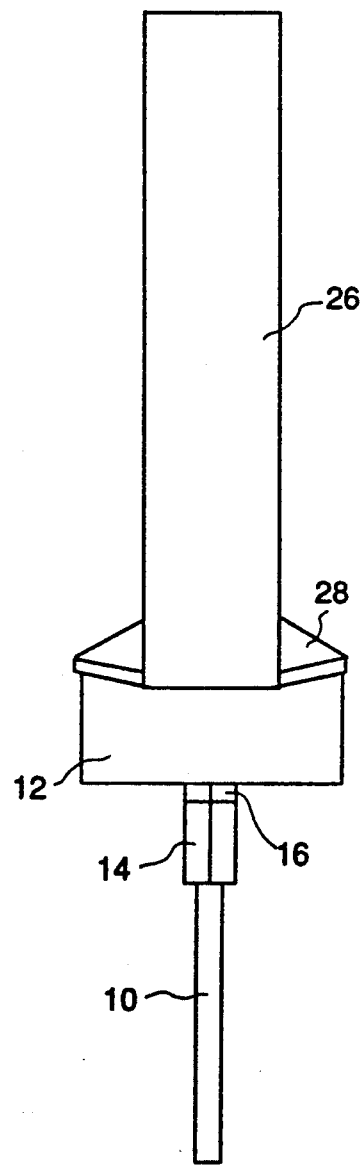

FIGS. 2a and 2b are cutaway illustrations showing the interior of housing 2. A proximity sensor 20 of known type is supported within housing 2 by proximity sensor support 22 and proximity sensor support nuts 24. The proximity sensor support 22 is illustratively fixed to a flat wall support 26, which may be made from flat steel. Chase nipple 28 preferably provides screw thread means for attachment of galvanic coupling 12. Finally, nut 30 cooperates with eye bolt 6 and nut 8 to provide coupling between chain 4 and housing 2.

The proximity sensor 20 may be inductive, capacitive, magnetic, or any other suitable sensor. In a preferred embodiment, it is an inductive sensor of the Eddy Current Killed Oscillator (ECKO) type that creates a radio frequency emission from an internal coil for inducing eddy currents in a metal surface that is located within a prescribed distance. As the metal surface moves towards and away from the sensor, the load on the oscillator increases and decreases. Suitable control circuitry takes advantage of this property to determine the proximity of the metal surface.

Figure 3:
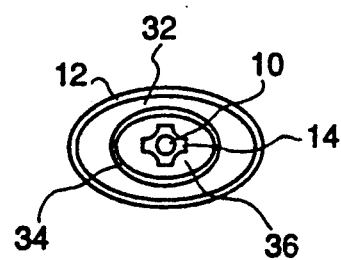
FIG. 3 is a bottom view illustrating the material level sensor hardware of the probe used in accordance with the invention.

FIG. 3 is an illustration looking in the direction of the arrows as shown in FIG. 2a. Within galvanic coupling 12, a pair of reducing bushings 32 and 34 are illustratively shown in a preferred embodiment. Reducing bushings 32 and 34 establish a limit of mobility for sensor bolt 10. Flat washer 36 is also illustratively shown cooperating with nut 8.

The above-described inventive probe is useful in general applications in conjunction with a Shorthead, Gyradisc, Standard or similar cone-type crusher designed to reduce large-size materials to aggregate products. A general description of the utility of this type of probe is set forth in the inventor's prior U.S. Pat. No. 4,804,148, the disclosure of which is hereby incorporated by reference.

Figure 4:
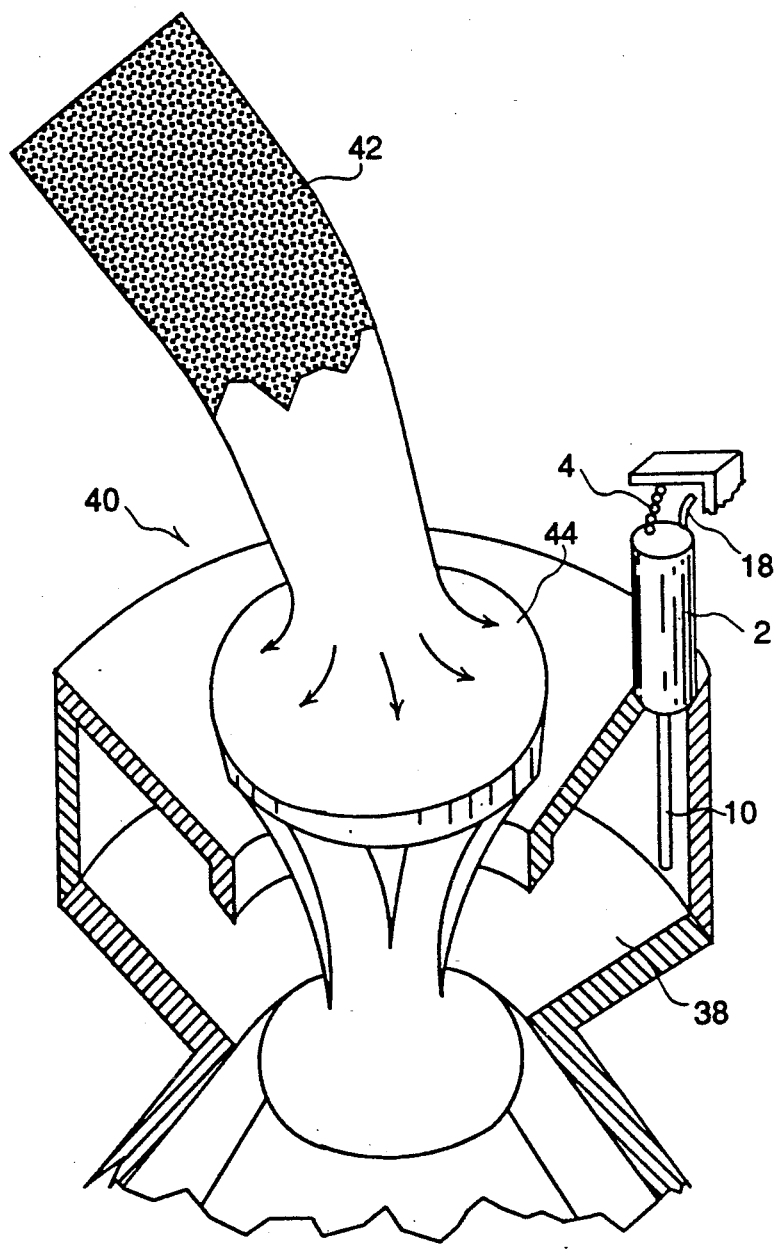
FIG. 4 illustrates one possible environment for use of the invention.

As that patent discusses, and with further reference to FIG. 4, the probe is suspended so that sensor bolt 10 extends within the crusher bowl 38 of a cone crusher, designated generally at 40. As the larger diameter rock 42 is delivered to crusher bowl 38 via distributor plate 44, it begins to accumulate in crusher bowl 38 until it reaches the level of sensor bolt 10.

When enough rock has accumulated in crusher bowl 38 to displace sensor bolt 10 from its normal equilibrium position, stud 11 is likewise displaced from its equilibrium position adjacent proximity sensor 20. When proximity sensor 20 senses that stud 11 is no longer adjacent to it, a signal is delivered via supply cord 18 to external signal processing circuitry 19, that registers the signal as a sign that the large diameter rock 42 has reached a predetermined level. By way of example, the displacement of stud 11 of 1.25 cm may be established as sufficient to trigger the signal transmission. The external circuitry can then direct the rock supplier, not shown, to reduce the volume of rock delivery until the probe determines that the level of rock in crusher bowl 38 has dropped below the approximate level of sensor bolt 10. Such a determination occurs when sensor bolt 10, no longer being displaced by the larger diameter rock, returns to its equilibrium position, and stud 11 likewise returns to its equilibrium position adjacent proximity sensor 20.

To improve the accuracy of the determination, a signal duration requirement may be incorporated in the proximity sensor 20 itself, or in the external circuitry.

For example, a requirement that the stud 11 be displaced for greater than 0.4 seconds eliminates a suitable number of false hits.

By the design of the probe, especially the preferred hardened steel construction and pivotability of sensor bolt 10 within flat washer 36 and bushings 32 and 34, and further by its suspension from chain 4, potentially damaging shocks due to the falling large diameter rock 42 are substantially reduced. Moreover, the design of the probe enables easy height adjustment and removal when maintenance on either the probe or the crusher is necessary.

Preferably, sensor bolt 10 is threadably engaged by the two rod couplings 14 to provide easy removal and replacement of rod 10, which is the only part of the probe that is likely to sustain significant wear. Moreover, the two-nut and washer design prohibits undesirable vertical travel of sensor bolt 10, which could affect the accuracy of the proximity determination made by proximity sensor 20.

Housing 2 is preferably constructed of a weightier material than are the other elements of the probe. This maximizes relative movement between sensor bolt 10 and proximity sensor 20, which is attached to housing 2. Maximization of relative movement minimizes the possibility that housing 2 will move along with, or instead of, sensor bolt 10 when sensor bolt 10 is displaced by the rising rock level.

Modifications that may be made to the basic design include sharpening the point of stud 11 to increase the sensitivity of proximity sensor 20 to stud displacement. The diameter of the actual sensor portion of proximity sensor 20 may also be tailored to adjust sensitivity. One of ordinary skill in the art will also recognize that adjustments may be made in the electronics external to the probe to fix the exact point at which the system determines that the rock level has reached the aforementioned predetermined height. The vertical position of sensor bolt 10, and, thus, stud 11, may also be adjusted to modify the sensitivity of the system.

Various other modifications will become readily apparent to one of ordinary skill in the art. All such modifications that basically rely upon the teachings set forth in the foregoing disclosure and through which the invention has advanced the state of the art are properly considered within the spirit and scope of the invention.

I claim:

1. A probe for sensing the level of accumulated material in an enclosure, comprising:
  a housing;
  first means for sensing the level of an accumulated material, including a first portion of the first means arranged within said housing to be displaced from a nominal quiescent point due to the presence of a predetermined level of the accumulated material;
  second means located within said housing for sensing the relative proximity of the first portion of the first means to the second means; and
  means for transmitting a signal to external circuitry to indicate that the relative proximity of the first portion of the first means to the second means has changed by a predetermined value as an indication that the predetermined level of accumulated material has been reached;
  wherein the first means further includes a second portion arranged to cause the first portion to be displaced from the nominal quiescent point when the second portion is contacted by the accumulated material as an indication that the predetermined level of accumulated material has been reached.

2. A probe as claimed in claim 1, wherein the proximity sensitivity of the second means is adjustable.

3. A probe for sensing the level of accumulated material in an enclosure, comprising:
a housing;
material level sensing means having first and second ends;
means for supporting the material level sensing means so that the first end is operably disposed within the housing and the second end is operably disposed outside the housing;
proximity sensing means, disposed with the housing in sensing relation to the first end of the material level sensing means, for sensing the relative proximity of first end of the material level sensing means; and
means for supporting the proximity sensing means with the housing;
wherein the proximity sensing means includes means for transmitting, to external circuitry, a signal containing information concerning the proximity between the first end of the material level sensing means and the proximity sensing means.

4. A probe as claimed in claim 3, wherein the proximity sensing means is arranged to have an adjustable proximity sensitivity.

5. A probe as claimed in claim 3, wherein said signal is an electrical signal.

6. A probe as claimed in claim 3, wherein said signal is an electromagnetic wave signal.

7. A probe as claimed in claim 3, wherein said signal is an acoustic wave signal.

8. A probe as claimed in claim 3, wherein said support means for the material level sensing means includes means for pivotably supporting the material level sensing means.

9. A probe as claimed in claim 8, wherein said housing includes an aperture through which the material level sensing means extends, the aperture being sufficiently large to permit the material level sensing means to pivot, and wherein said probe further comprises at least one reducing bushing disposed within the aperture.

10. A probe as claimed in claim 3, further comprising the electrical circuitry, which includes means for receiving said signal and for determining the relative proximity between the first end of the material level sensing means and the proximity sensing means as an indication of material level within an enclosure.

11. A probe as claimed in claim 10, further comprising means for determining that the material level has reached a predetermined level when the first end of the material level sensing means is displaced by a predetermined distance for a predetermined time.

* * * * *